May 19, 1925.

K. L. HARRIS ET AL 1,538,804

AUTOMOBILE BUMPER

Filed Oct. 7, 1924    2 Sheets-Sheet 1

K. L. Harris
and C. W. Harris
INVENTORS

WITNESSES
Louis Goodman
Jo. Ellis.

BY

ATTORNEY

May 19, 1925. 1,538,804
K. L. HARRIS ET AL
AUTOMOBILE BUMPER
Filed Oct. 7, 1924   2 Sheets-Sheet 2
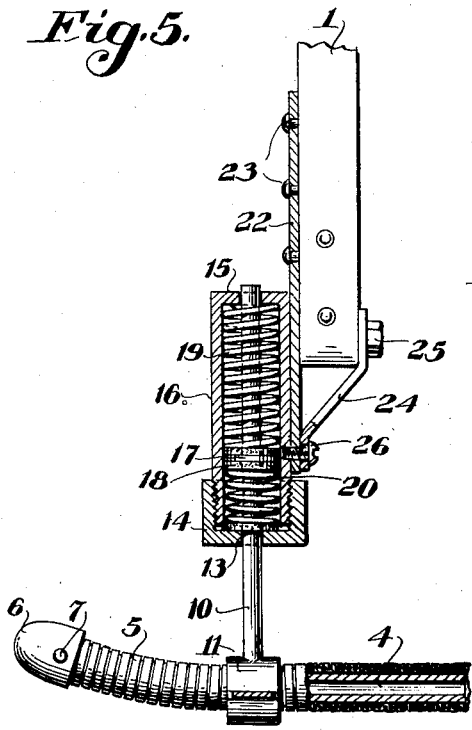
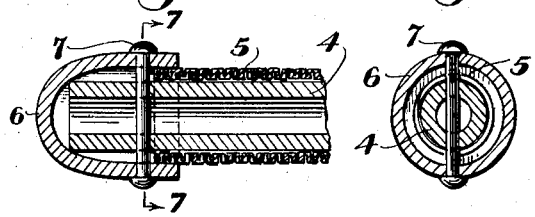
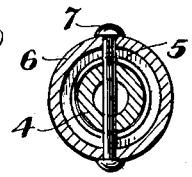
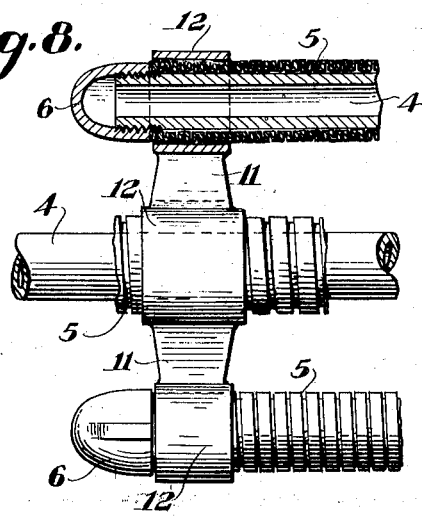
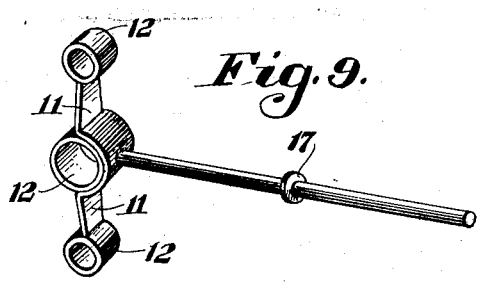
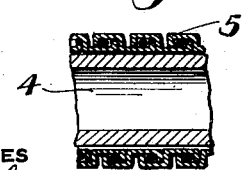
K. L. Harris
and C. W. Harris
INVENTORS Patented May 19, 1925.

1,538,804

UNITED STATES PATENT OFFICE.

KENNETH LESTER HARRIS AND CHARLES WESTERMAN HARRIS, OF NEW BRIGHTON, PENNSYLVANIA.

AUTOMOBILE BUMPER.

Application filed October 7, 1924. Serial No. 742,138.

*To all whom it may concern:*

Be it known that we, KENNETH L. HARRIS and CHARLES W. HARRIS, citizens of the United States, residing at New Brighton, in the county of Beaver and State of Pennsylvania, have invented a new and useful Improvement in Automobile Bumpers, of which the following is a specification.

The present invention relates to automobile bumpers, and has for an object the provision of a flexible metallic covering for the bumper bar or bolster to protect the same, and which may be rotated thereon to cause damaged parts of the covering to be concealed from view at the front of the automobile.

A further object of the invention is to provide novel means for securing the bumper to an automobile so as to absorb the shock of impacts thereagainst and thus relieve the automobile thereof.

With these and other objects in view, as will become apparent as the description proceeds, the invention consists of the details of construction, combination of elements and arrangements of parts hereinafter to be described and claimed.

A full and complete understanding of the invention may be obtained from a consideration of the following detailed description, taken in connection with the accompanying drawing forming a part of this specification, it being understood that while the drawing shows a practical form of the invention, the latter is not to be confined to strict conformity with the showing thereof, but may be changed or modified, so long as such changes and modifications mark no material departure from the salient features of the invention, as specifically pointed out in the appended claims.

In the drawing, in which similar reference characters refer to similar parts throughout the several figures:—

Figure 5 is an enlarged horizontal sectional view of a portion of the bumper structure and support;

Figure 6 is an enlarged detail, in section, of a portion of one of the bumper rods;

Figure 7 is a sectional view taken on the line 7—7 of Figure 6;

Figure 8 is an enlarged fragmentary view partly in section to illustrate a modified form of connection between the cap and bumper bar;

Figure 9 is a detail perspective view of the combined plunger and supporting member;

Figure 11 is a sectional view of the metallic strip forming the flexible casing.

Figure 1:
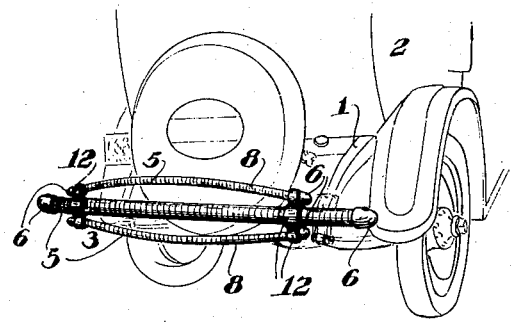
Figure 1 is a perspective view showing a bumper embodying this invention as applied to the rear of an automobile.

In the drawing 1 indicates the frame of an automobile 2, upon the front and rear ends of which are mounted bumpers 3 to absorb the shock of impacts thereagainst, and thereby relieve the automobile.

It is desirable that the bumpers 3, in addition to performing their primary function of protecting the automobile, be maintained in such condition that they add to the attractive appearance of the car. Prior to this invention, the bumpers have been plated and highly polished and are attractive only until such time as the plating and polish are damaged or worn, when the entire bumper must be replated to restore its attractive appearance.

In accordance with this invention, each bumper comprises a plurality of rods 4, each rod being encased in a flexible removable and rotatable sleeve or casing 5, which may be suitably plated and polished. The rods themselves may therefore be constructed of cheap material with no plating.

It is preferable that the casing 5 be of flexible tubing commonly known as "Greenfield", and widely used as a conduit for electrical wires, and comprising a metallic strip, substantially S-shaped in cross section, which is spirally wound with the sides of the strip engaging in the grooves of the adjacent portions thereof (Fig. 11), but it is obvious that any other flexible tubing would serve as well, and if the rods 4 were straight instead of curved as shown, a plain or corrugated rigid tube might be used as a casing for the rod.

The ends of the casing 5 extend to points adjacent the ends of the rod 4, and the casing is held in position by caps 6, which may fit over the ends of the rod and casing and be secured by pins 7 passing through the rod, as best shown in Figure 6, or the caps may have threaded connection with the rod and abut the ends of the casing, as shown in Figure 8.

It will be observed that by this construction should the casing 5 become damaged by its engagement with an object, or become worn by use, it is only necessary to rotate the same on the rod 4 so as to move the damaged portion to a position invisible from the front of the vehicle. Should a portion of the casing be seriously affected, that portion may be cut out and a new portion quickly inserted on the rod in its place with less inconvenience and at a cost considerably less than that required to replate a whole bumper bar.

Figure 2:
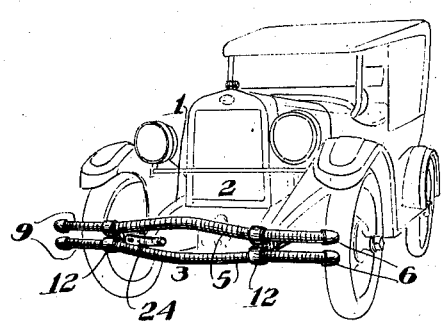
Figure 2 is a similar view showing a bumper as applied to the front of an automobile.

If auxiliary bumper rods 8 are to be employed above and below the center rod 4, as shown in Figures 1, 3, 5 and 8, or if a pair of oppositely curved rods 9 are to be used in lieu of the main rod 4, as shown in Figure 2, each of the rods is provided with a flexible casing 5 and caps 6 as above described.

The complete bumper structure 3 is supported by a pair of rods 10, each of which had a holder 11 secured to its front end and formed with sleeves 12 for loosely receiving the respective casings which contain the rods, so as to permit circumferential or longitudinal movement thereof.

The rods 10 pass through and have bearing in the centrally located alined apertures 13 in the ends 14 and 15 of the cylinders 16. There is provided on each of the rods 10, intermediate its ends, an integral disk 17, on each side of which is disposed a gasket 18 of leather, or other suitable material, which engages the interior wall of the cylinder and constitutes a piston head. Expansion spring 19 having its respective ends in engagement with the end 15 of the cylinder 16 and one of the gaskets 18 yieldingly holds the rod in its extended position, which is limited by a shorter spring 20 between the other gasket 18 and the end 14 of the cylinder. The spring 19 and the air contained in the cylinder together serve to absorb the shock when the bumpers 3 strike an object, and the spring 20 serves to break the force of the return of the rod to its normal position. Good results, however, may be obtained without using the spring 20.

Figure 4:
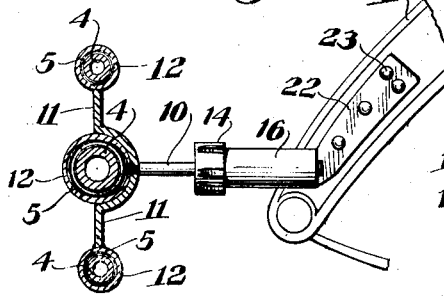
Figure 4 is an enlarged detail view, partly in section, of the preferred form of bumper support as applied to the frame.

Each cylinder 16 of the front bumper is held in substantially horizontal position by an angled bracket 22, one end of which is welded or otherwise made rigid with the cylinder, the other end being secured to the chassis or frame 1 by rivets or bolts 23, as best shown in Figure 4 of the drawing and further supported by the Z-shaped brace 24, having one of its parallel arms bolted to the chassis, as at 25, and its other arm secured to both the bracket 22 and cylinder 16 by the machine screw 26.

Figure 3:
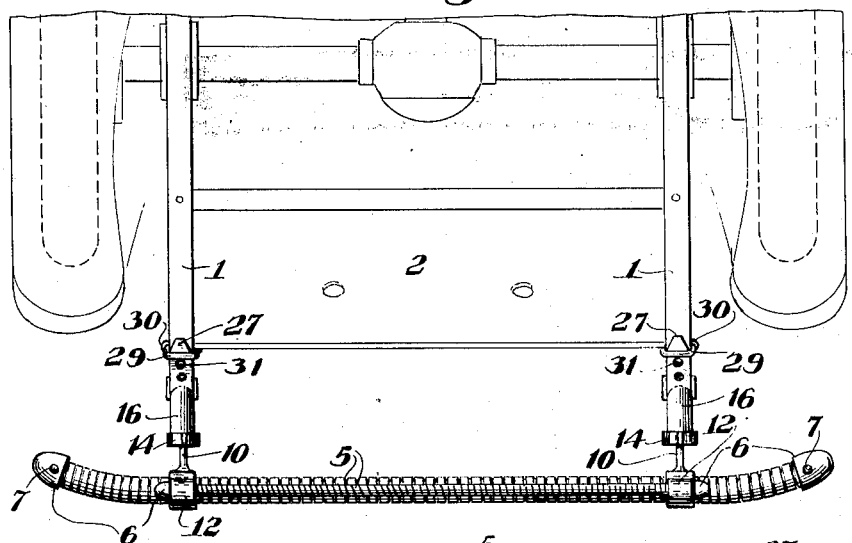
Figure 3 is an enlarged plan view illustrating the construction for attaching the bumper directly to the ends of the frame.
Figure 10:
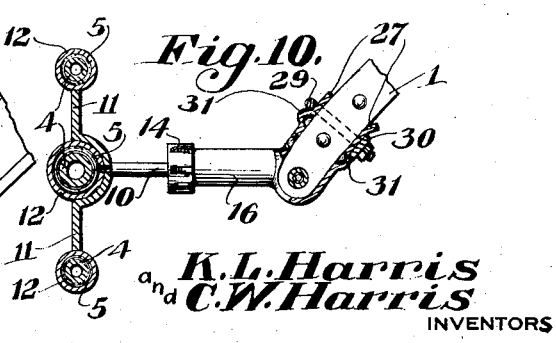
Figure 10 is a detail view partly in side elevation and partly in section of the bumper support as shown in Figure 3.

In the rear bumper, as illustrated in Figures 3 and 10 of the drawing, the inner end of the cylinder 16 is closed and provided with spaced diverging arms 27, which are held in position on the frame by the U-bolt 29 and the plate 30, the U-bolt 29 engaging the raised boss heads 31 provided on the arms 27 to prevent the U-bolt from sliding off the frame 1 due to the taper thereof.

What is claimed is:—

1. An automobile bumper comprising a rod, a removable and rotatable metallic casing through which the rod extends, and means for retaining the casing on the rod.

2. An automobile bumper comprising a rod, a removable, flexible metallic casing through which the rod extends, said casing being rotatable on the rod, and means for retaining the casing against movement longitudinally of the rod.

3. An automobile bumper comprising a rod, a removable, flexible casing through which the rod extends, said casing being formed of a spirally wound metallic strip, and means for retaining the casing on the rod.

4. An automobile bumper comprising a rod, a flexible metallic casing through which the rod extends, said casing being rotatable on the rod, means for removably retaining the casing thereon, and means for supporting the rod in operative position on an automobile.

5. An automobile bumper comprising a plurality of spaced rods, flexible metallic sleeves rotatably and removably mounted thereon, and means for supporting said rods in superimposed relation in operative position on an automobile.

6. In an automobile bumper, a curved rod, a flexible metallic sleeve through which the rod extends, said sleeve being rotatable upon the rod, and caps removably mounted on the ends of said rod and overlying the ends of said sleeve and removably retaining the latter on the rod.

7. An automobile bumper comprising a plurality of bumper rods, casings surrounding the respective rods and rotatable thereon, a pair of holders each having a plurality of superposed sleeves removably supporting the respective ends of said bumper rods, supporting rods secured to the respective holders and extending rearwardly therefrom, and means for supporting said rearwardly extending rods so as to permit them to yield rearwardly.

8. An automobile bumper comprising a pair of slidably mounted longitudinally disposed supporting rods, yieldable means resisting their longitudinal movement, holders secured to the outer extremities of said rods and each having a plurality of sleeves, and transverse bumper elements having their ends mounted in the respective sleeves, each of said elements comprising an inner rod surrounded by a casing which is adjustable circumferentially thereof.

9. An automobile bumper comprising a pair of longitudinally reciprocable supporting rods, yieldable means resisting their reciprocating movement, holders secured to the outer extremities of said rods and each having a plurality of sleeves, transverse bumper elements having their ends mounted in the respective sleeves, each of said elements comprising a curved rod, a flexible metallic sleeve through which the rod extends, said sleeve being rotatable upon the rod, and caps removably mounted on the ends of said curved rod and removably retaining the sleeve upon the rod.

In testimony, that we claim the foregoing as our own, we have hereto affixed our signatures.

KENNETH LESTER HARRIS.
CHARLES WESTERMAN HARRIS.